WILLIAM M. WELLING.
Improvement in Hand Mirrors.
No. 125,867.                                    Patented April 16, 1872.
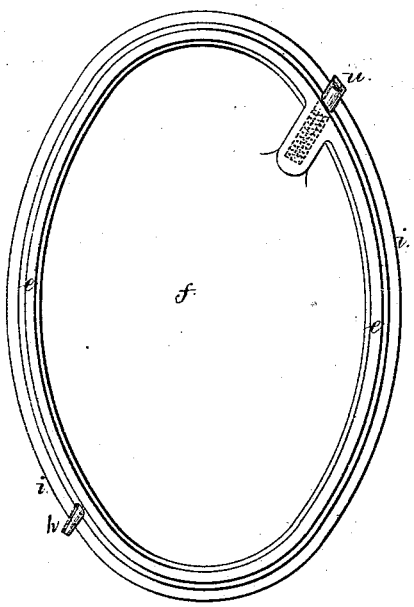
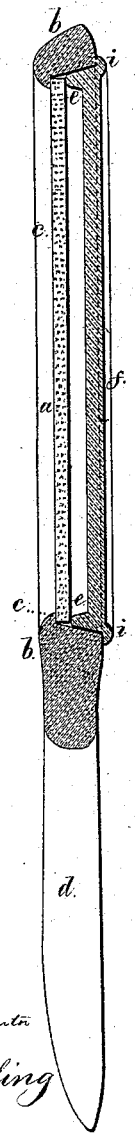
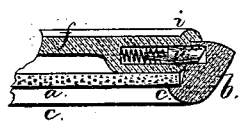

125,867

UNITED STATES PATENT OFFICE.

WILLIAM M. WELLING, OF NEW YORK, N. Y.

IMPROVEMENT IN HAND-MIRRORS.

Specification forming part of Letters Patent No. 125,867, dated April 16, 1872.

*To all whom it may concern:*

Be it known that I, WILLIAM M. WELLING, of the city and State of New York, have invented an Improvement in Hand-Mirrors; and the following is declared to be a correct description of the same.

This mirror is made with a frame of composition pressed to shape in a mold, the back of the mirror is a separate piece held in place by spring-catches, and having a flange that covers the joint between the back and the frame.

Mirrors have been made with a frame of composition pressed, while hot, in a mold; but there has been difficulty in introducing the glass and securing the same firmly, and obtaining the required ornamental appearance.

In some instances the frame, back, and handle have been of composition pressed in a mold out of one piece, with a cavity for receiving the glass; but the glass had to be secured by a separate strip at the front, around its edge, which is liable to become detached, and is objectionable in appearance. These difficulties are avoided in my improved mirror made as aforesaid.

In the drawing, Figure 1 is a longitudinal section of the mirror and frame complete. Fig. 2 is a section at one side, where the spring-bolt is applied; and Fig. 3 is a view of the inner side of the removable back.

The frame is made of a composition, such as shellac and wood-dust, or other material that will become sufficiently hard and strong when cool. The opening for the glass $a$ in the ring-frame $b$ is of the desired size and shape, and there is an inward flange, $c$, against which the glass rests. The handle $d$ extends from one of the sides of the frame $b$, and is made of the same material as the frame $b$, and of the desired shape. The back $f$ is also of composition pressed in a mold and made with a rim, $e$, to set within the frame $b$, and an ornamental flange, $i$, to lap upon the surface at the back of the frame $b$, and cover the joint. This back is held in place by a spring-bolt or bolts. The bolt may be in the frame $b$ and enter a cavity or hole in the rim $e$, or the reverse. I have shown a spring-bolt, $u$, in the back $f$, at one side, and a stationary pin, $h$, at the other side, to hold the back to the frame. Two bolts at the ends of a spring-wire might be used, the bolts passing through holes in the rim $e$, and the spring of the wire itself acts to project the bolts $u$ at its ends into holes in the frame $b$. By means of these bolts the back of the mirror is held firmly in place, and it cannot be removed except in cases where the glass is broken, and then the back can easily be taken off after the pieces of glass are removed, and another glass inserted. If desired, cement might be applied around the edges of the glass and of the back to make the joints water-proof.

I claim as my invention—

The mirror-frame $b$ and back $f$, made of composition pressed in molds, substantially as shown and described, in combination with the spring-bolt or bolts to hold the back into its place, as set forth.

Signed by me this 9th day of March, A. D. 1872.

W. M. WELLING.

Witnesses:
GEO. T. PINCKNEY,
CHAS. H. SMITH.